United States Patent Office 3,658,890
Patented Apr. 25, 1972

3,658,890
ESTERS, SALTS AND ACIDS OF PARTIAL ANHYDRIDES OF ALKYLIDENE PHOSPHONYL PHOSPHINE OXIDES
Al F. Kerst, Denver, Colo., assignor to Monsanto Company, St. Louis, Mo.
No Drawing. Filed June 11, 1969, Ser. No. 832,418
Int. Cl. C07f 9/38, 9/40
U.S. Cl. 260—502.4 P    9 Claims

ABSTRACT OF THE DISCLOSURE

This invention relates to partial anhydrides of alkylidene phosphonyl phosphine oxides and include such compounds as shown below:

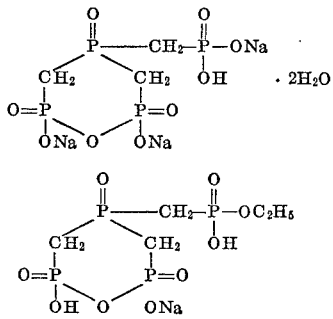

This invention relates to partial anhydrides or organophosphonates and more particularly to partial anhydrides of alkylidene phosphonyl phosphine oxides, hydrates thereof and mixtures thereof, and processes for preparing the same.

An object of this invention is to provide new and useful partial anhydrides of organo-phosphonates.

Another object of this invention is to provide new and useful partial anhydrides of alkylidene phosphonyl phosphine oxides which contain at least one metal cation in the overall molecular structure.

A further object of this invention is to provide processes for preparing partial anhydrides of alkylidene phosphonyl phosphine oxides.

Further objects of this invention will become apparent from a reading of the subsequent description and the appended claims.

This invention is directed to new and useful partial anhydrides of alkylidene phosphonyl phosphine oxides having the formula (I) 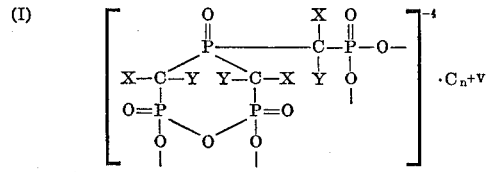

and the esters thereof hereinafter described.

In the above formula X and Y are each selected from the group consisting of hydrogen and hydrocarbyl groups containing from 1 to 6 carbon atoms. These hydrocarbyl groups are preferably alkyl groups which can be either straight chain or branched chain and may either be substituted or unsubstituted. As examples of substituents which may be utilized, there may be mentioned halides (fluoride, chloride, bromide and iodide), hydroxy, sulfonyl and the like.

In the above formula $$C_n^{+V}$$

generically designated cations which include metal ions (e.g. alkali metal ions—Na, K, Rb, Cs, Fr; alkaline earth metal ions—Ba, Sr, Ca, Mg; and metals such as Fe, Zn and Mn), hydrogen ions, ammonium ions, organic ammonium ions having the formula

wherein R is an alkyl group containing from 1 to 6 carbon atoms or hydrogen, and combinations of said ions. It is to be understood then, that C can represent not only a single type cation such as hydrogen but can also represent a combination of different type cations such as hydrogen and sodium. It should be noted however, that the valence of a single type cation or the sum total of the valences of a combination of different type cations have a total positive charge of 4.

Referring more specifically to V in the above formula I, V designates the individual valence of the cations heretofore mentioned and $n$ has a total value of 1 through 4 depending upon the valence of the cation. Thus, where one desires to utilize a combination of either like or different type cations, the combinations of said cations may be expressed as $$C_{ni}^{+Vi} + C_{nii}^{+Vii} + C_{niii}^{+Viii} + C_{niiii}^{+Viiii}$$

wherein (Vi)(ni)+(Vii)(nii)+(Viii)(niii)+(Viiii)(niiii)

equals 4. Examples of using only one type cation and using a combination of different type cations are set forth below:

(a) 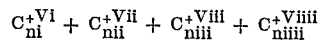

(b) 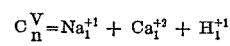

(c) 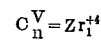

(d) 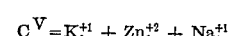

(e) 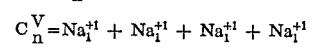

It is to be understood that the compounds falling within the above Formula I include the anhydrous compound per se and hydrates thereof and also mixtures of both the anhydrous and hydrates of said partial anhydrides.

As examples of partial anhydrides falling within the above-described compounds of Formula I there may be illustrated the compounds set forth in Formulae II, III and IV as shown below:

(II) Trisodium tri(methyl phosphonyl) phosphine oxide monoanhydride

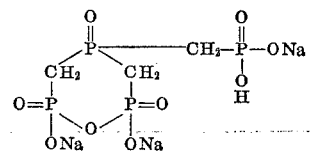

(III) Tri(methyl phosphonyl) phosphine oxide monoanhydride

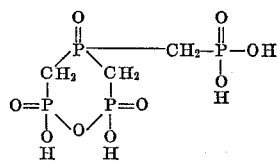

(IV) Monopotassium, disodium tri(methyl phosphonyl) phosphine oxide monoanhydride

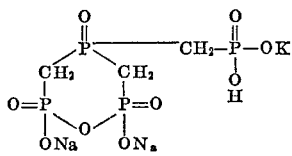

It is to be understood then that the term "partial anhydride of alkylidene phosphonyl phosphine oxide" 'as used herein generically describes all of the foregoing (e.g. compounds of Formulae I, II, III and IV) compounds and esters thereof, including the anhydrous forms, hydrate forms and mixture thereo.

In general, the partial anhydrides of the present invention can be prepared by reacting a full or complete anhydride of tris(alkylidene phosphonyl) phosphine oxide with either water, followed by additional steps hereinafter described, or with an aqueous solution of a metal hydroxide. More specifically, the starting material is a complete and full anhydride of "tri- (or tris) (lower alkylidene phosphonyl) phosphine oxide" as shown by the following structural formula:

(V)

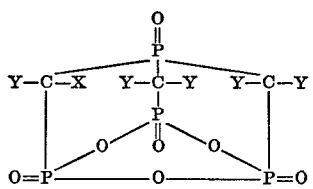

In the above Formula V, X and Y are each of the character as heretofore defined in Formula I as set forth above. The complete or full anhydrides of tri(lower alkylidene phosphonyl) phosphine oxide are disclosed and described as well as methods for preparing same in a copending application, Serial No. 832,491 filed June 11, 1969 of Al F. Kerst entitled "Anhydrides of Organo Alkylidene Phosphonyl Phosphine Oxides" which is incorporated herein by reference.

The aforementioned full anhydride of tri(lower alkylidene phosphonyl) phosphine oxide, in turn, is prepared from the parent acid form of said phosphine oxide anhydride. These "acids" as such are prepared from the esters as subsequently described and shown.

The tris(phosphonylmethyl) phosphine oxides are prepared, for example, by the following reactions:

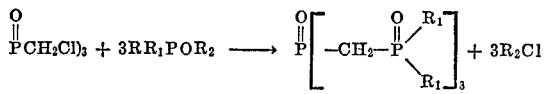

The phosphine oxide esters of Formula 5 are then converted to the acids per se by hydrolysis thereof by refluxing with concentrated HCl as well as thermal decomposition. Specific examples of R and $R_1$, in conjunction with the preparation of said esters of Formula 5, are listed below:

| | R | $R_1$ |
|---|---|---|
| (a) | $CH_3O$ | $CH_3O$ |
| (b) | $C_2H_5O$ | $C_2H_5O$ |
| (c) | iso-$C_3H_7O$ | iso-$C_3H_7O$ |
| (d) | n-$C_4H_9O$ | n-$C_4H_9O$ |
| (e) | 2-ethyl-hexyl-O- | 2-ethyl-hexyl-O- |
| (f) | $C_4H_9O$ | $C_6H_5$ |
| (g) | $C_6H_5$ | $C_6H_5$ |

In conjunction with the preparation of the partial anhydrides of the present invention via hydrolysis per se to form the fully protonated partial anhydride (note Formula III), the complete anhydride is reacted with at least sufficeint stoichiometric amounts of water in a reaction vessel. After the reaction has been substantially completed, the resultant reaction product is frozen, e.g. by immersing the vessel in a slurry of a mixture of dry ice and acetone for a sufficient period of time in order to substantially freeze the contents of the vessel. The resultant frozen mixture containing the partial anhydrides as disclosed in Formula III then undergoes a lyophilization procedure ("freeze drying") wherein dehydration is carried out by the aid of vacuum. The resultant substantially anhydrous partial anhydride (Formula III) is solid and substantially stable at room temperature.

An alternative method for preparing the fully protonated partial anhydride (as disclosed in Formula III) can be carried out whereby the complete anhydride (Formula V) is reacted with water (as heretofore mentioned in the first step of the procedure outlined above) followed by the addition of at least stoichiometric amounts of a metal hydroxide such as barium hydroxide (in water) which results in the formation of the partial anhydride containing two barium cations in the molecular structure. (This is established by the elemental analysis of the dried material and by nuclear magnetic resonance spectra, herein referred to a N.M.R. for the sake of brevity, of the $P^{31}$ and $H^1$ atoms.) The barium containing partial anhydride is separated from the reaction mixture by the addition of a water soluble organic solvent such as ethanol, followed by filtration and washed with an inert liquid, nonaqueous organic solvent such as methanol, ethanol, acetone, dimethyl formamide and the like to remove the residual water. The filter cake (the barium-partial anhydride) is then dried and subsequently slurried with an organic solvent such as ether. Substantially anhydrous $H_2SO_4$ (or any mineral acids which will form a salt precipitate with the cation of the aforementioned metal hydroxide) in an organic solvent such as ether is then reacted with the partial anhydride—ether slurry to form the fully protonated partial anhydride and a barium sulfate precipitate. A halo-hydrocarbon such as chloroform is added to end products to assist the separation of the anhydride from the $BaSO_4$. After stirring to insure complete reaction, the $BaSO_4$ is filtered off. The remaining solution is then subjected to rotatory evaporation which yields the fully protonated partial anhydride (Formula III).

Where one desires to prepare the partial anhydride which contains a metallic cation or cations in its molecular structure (i.e. either a partially or fully neutralized partial anhydride), the full or complete anhydride (Formula V) is reacted with an aqueous solution of a metal hydroxide (e.g. NaOH, KOH and the like or mixtures of NaOH and KOH). Generally, this reaction is carried out at room temperature, however, it is to be understood that it is within the scope of the present invention that these reactions can be carried out at any temperature above the freezing point of the reactants and below the boiling point thereof. Furthermore, these reactions can be carried out at atmospheric conditions or at sub-atmospheric or super-atmospheric conditions as long as there is substantially no adverse effect in obtaining the desired end product, i.e. the partial anhydride.

In conjunction with the amounts of the reactants which are utilized, it is to be understood that different amounts of either one reactant or the other will product different cation-containing partial anhydrides. For example, where one desires to prepare the partially neutralized partial anhydride similar to the one shown in the above Formula II, the stoichiometric amounts utilized would be one mole of the complete anhydride of Formula V (wherein X and Y are each hydrogen) and three moles of sodium hydroxide. By the same token, where one uses one mole of the complete anhydride (Formula V wherein X and Y are each hydrogen) and four moles of sodium hydroxide, the resultant product would be the completely neutralized partial anhydride as shown by the formula set forth below:

(VI) 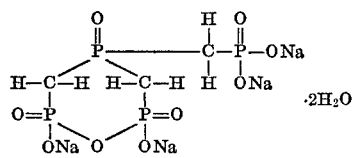

In general, the partial anhydrides of alkylidene phosphonyl phosphine oxides of the present invention have utility in practically all fields wherein their parent complete anhydrides (Formula V) properties can be utilized.

In particular, the compounds of the present invention can find utility in such fields as sequestering or chelating agents, water-treating agents (including usage in threshold amounts), stabilizers for peroxy compounds, soap anti-oxidants, additives in liquid soap, detergents, and shampoos, agents for use in scouring wool cloth and cotton keir boiling, metal cleaning compositions, rubber and plastic compositions and polymerization processes, bottle washing compositions, dairy cleaning compositions, agents for use in pulp and paper processing, corrosion inhibitors, feed and vegetation supplements (including micronutrients,) herbicides, insecticides, metal treating compositions, electroplating, detergent builders for organic surfactant actives, lime soap dispersants, surfactants, film formers in hair sprays and soluble packages, dispersants for clays, drilling muds, paper pulps, inorganic and organic pigments, and cement slurries, bactericide potentiators, hair modifiers in shampoos, fertilizers, food and beverage acidulants, leavening agents, cheese emulsifiers, modifying agents in evaporated and condensed milk, flame retardants in paints and for natural and synthetic fibers, oil additives, gasoline additives, dentifrice compositions and the like.

In addition to the end-use applications set forth immediately above, the partial anhydrides of the present invention represent new, unique organo phosphorus structures which are high in phosphorous content and which also can function as chemical intermediates in order to prepare other materials. In other words, the present invention phosphine oxide anhydrides react readily with alcohols, phenols and amines to form esters and amides. Furthermore, these phosphine oxide partial anhydrides will combine with a wide variety of substances containing any form of hydroxyl or amino group, such as in cellulose (for example paper, textiles, wood and the like), polymeric alcohols, polymeric amines and other polymers.

The following examples are presented to illustrate the invention, with parts and percentages by weight being used in the examples unless otherwise indicated.

EXAMPLE I

Approximately 3.99 grams of the complete anhydride of tri(methyl phosphonyl) phosphine oxide having the formula of V above wherein X and Y are hydrogen, are added to 300 milliliters of an aqueous solution containing 19.6 milliliters of a 2.5 N sodium hydroxide. The complete anhydride is added with stirring over a period of approxmiately two minutes to the sodium hydroxide solution contained in the reaction vessel. The final pH of the resultant mixing is 7.6. The reaction mixture is then evaporated to a white solid which is then rinsed with stirring in three-100 milliliter portions of acetone. The resultant solid is isolated by filtration and is dried for 48 hours at 25° C. in vacuum to give a total yield of 4.93 grams. An elemental analysis and the $P^{31}$ N.M.R. and $H^1$ N.M.R. show that the resultant material has the structural formula of a partial anhydride as shown in Formula III heretofore set forth.

EXAMPLE II

The procedure as set forth in Example I is repeated with the exception that approximately one-third of the 2.5 N sodium hydroxide solution is substituted with a 2.5 N potassium hydroxide solution. The resultant product is a partial anhydride containing two sodium ions and one potassium ion and which is analyzed to have the structural formula of the compound of Formula IV heretofore set forth in this specification.

EXAMPLE III

Stoichiometric quantities of the complete anhydride of tri(methyl phosphonyl) phosphine oxide and water are reacted together in a vessel over a period of approximately four minutes at 25° C. During this four minute reaction period, the contents of the reaction vessel are continuously stirred. The reaction vessel is then immersed in a Dry Ice-acetone bath for a period of approximately five minutes in order to completely freeze the resultant reaction mixture. The frozen contents of the reaction vessel are then dehydrated by applying $10^{-3}$ millimeters of mercury vacuum. The resultant product which is solid is analyzed by elemental analysis and $P^{31}$ N.M.R. and $H^1$ N.M.R. to have the formula structure of the compound of Formula III heretofore set forth in this specification.

EXAMPLE IV

Approximately 1.0 gram of the partial anhydride which is prepared by the procedure of Example I is added to one liter of tap water which contains approximately 300 parts per million of calcium carbonate in order to test the partial anhydride as an effective sequestering agent. The resultant solution is stirred rapidly for a period of approximately three minutes. The final pH of the solution is approximately three minutes. The final pH of the solution is approximately 9.7. The calcium ion concentrations and sequestering agent concentrations found in p.p.m. are converted to a weight basis. An analysis of the solution shows that approximately 11.0 pounds of calcium can be sequestered by approximately 100 pounds of the partial anhydride of Formula II. It can be observed then that the partial anhydrides of the present invention are quite effective in sequestering undesirable metal ions in solutions. Furthermore, the partial anhydrides of the present invention are found to be quite effective over a wide pH range and in both an acidic and alkaline solution. Also, it is found that the solubility of these partial anhydrides is greater than the parent complete anhydride (Formula V) and consequently the partial anhydride is reactive with more substrates than the parent complete anhydride. It can therefore be appreciated that as one utility of these partial anhydrides they can be effectively utilized as sequestering agents in many and varied applications.

EXAMPLE V

In order to demonstrate another utility of the present invention phosphine oxide partial anhydrides, approximately 100 grams of each of the phosphine oxide anhydrides prepared and described in the foregoing Examples I-III is separately and individually mixed with an inert solvent in a 500 ml. beaker, in this case, carbon tetrachloride, in order to prepare a 10% by weight (solution or) slurry of each anhydride. After the three separate slurries are prepared, a separate and individual swatch of a 3" x 3" undyed cotton cellulose is intimately contacted with each slurry by submerging such swatch in the slurry for approximately 3 minutes. The three separate swatches are withdrawn from the beakers containing these slurries (or solutions) and are dried for 10 minutes in an oven which is maintained at a temperature of approximately 80° C. After a lapse of 10 minutes at 80° C., the temperature is elevated and the swatches are then subjected to a temperature of approximately 150° C. for approximately 5 minutes in order to "set up" a reaction between the specific phosphine oxide partial anhydride with the hydroxy groups on the cotton cellulose surface.

The three dried swatches of "treated" cotton are individually tested for flame retardancy by positioning a swatch over a bunsen burner. The flame is adjusted to a point at which the tip of the flame is approximately 1 inch beneath the cotton swatch. An untreated cotton swatch is used as a control for comparative purposes. The flame underneath each of the individual cotton swatches (including the control) is maintained for approximately 30 seconds and then is removed. Visual observations are made. The results of this test show that the control sample, i.e., the cotton swatch which was not treated with any phosphine oxide partial anhydride, is completely destroyed. However, with each of the three treated cotton swatches, there is primarily only charing, and the flame on the material is self-extinguishing upon the removal of the bunsen burner away from the cotton swatches. Thus, it can readily be seen that one of the unique applications of the phosphine oxide partial anhydrides of the present invention is its use as a fire retardant for cellulose material, for example, cotton clothing.

It is also within the scope of the present invention to include the esters of the partial anhydrides of the phosphine oxides and which esters have the formula:

(VI)
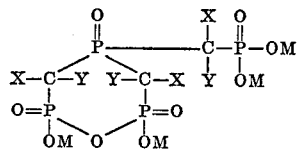

wherein M is either

a cation or an organic radical, R, from the group alkyl, alkenyl, aryl, alkyl aryl, cyclic and alicyclic and where R contains from 1 to about 30 carbon atoms. It is to be understood that at least one M in the above Formula VI must be R in order to have the ester.

With reference to the substituents listed for the organic radical R above, the preferred substituents are the following:

(a) alkyl—containing from about 1 to about 18 carbon atoms;
(b) alkenyl—containing from about 1 to about 18 carbon atoms;
(c) aryl—phenyl, naphthyl, anthryl, or phenanthryl;
(d) alkyl aryl—hydroxy, halogen, lower alkyl, (alkaryl) having from 1 to about 6 carbon atoms, and amino substituted phenyl naphthyl, anthryl, or phenanthryl;
(e) cyclic—containing from about 4 to about 8 carbon atoms and there may be present in the ring either a nitrogen, sulfur, oxygen or phosphorus atom; and
(f) alicyclic—containing from about 4 to about 10 carbon atoms.

As examples of esters of the partial anhydrides falling within the above-described compound of Formula VI, there may be illustrated the compounds set forth in Formulae VII, VIII, IX and X as shown below:

(VII) Triethyl tri(methyl phosphonyl) phosphine oxide monoanhydride

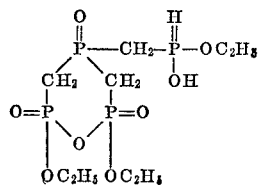

(VIII) Diphenyl, monosodium tri(methyl phosphonyl) phosphine oxide monoanhydride

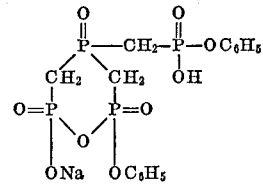

(IX) Pyridyl trisodium tri(methyl phosphonyl) phosphine oxide monoanhydride

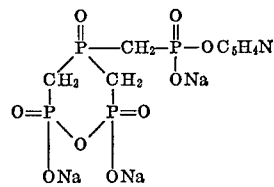

(X) Chlorophenyl monopotassium monosodium tri (methyl phosphonyl) phosphine oxide monoanhydride

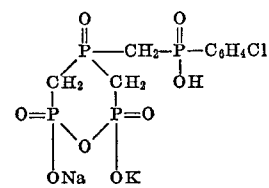

The esters of the partial anhydrides of the phosphine oxides can generally be prepared by reacting the full or complete anhydride, heretofore described, with a cation,

containing material and an anion, −OR (R is the above described organic radical) in an inert solvent. For example, the compound shown in Formula VII above can be prepared by reacting the full anhydride with ethanol in pyridine and then quenching with a dilute base, for example 10% NaOH solution, after 5 minutes at 25° C.

These esters are effective fire retardants as measured by a standard burn test, ASTM–D1692–D59T.

What is claimed is:
1. A partial anhydride selected from the group consisting of (1) an alkylidene phosphonyl phosphine oxide having the formula:

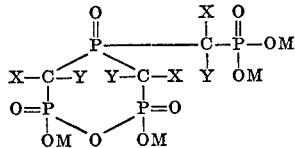

wherein X and Y are each selected from the group consisting of hydrogen and hydrocarbyl groups containing from 1 to 6 carbon atoms; and M is selected from the group consisting of (a) alkali metal ions, alkaline earth metal ions, hydrogen ions, ammonium ions, organic ammonium ions having the formula

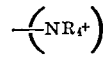

wherein R is an alkyl group containing from 1 to 6 carbon atoms or hydrogen, and combinations of said ions, and (b) organic radicals selected from the group consisting of alkyl, alkenyl, aryl and alkyl aryl, with the proviso that said organic radicals contain from about 1 to about 30 carbon atoms; and (2) hydrates of said phosphine oxides.

2. The partial anhydride as set forth i claim 1 wherein X and Y are each hydrogen.

3. The partial anhydride as set forth in claim 2 wherein M is an alkali metal ion.

4. The partial anhydride as set forth in claim 1 wherein M is a hydrogen ion.

5. The partial anhydride as set forth in claim 1 wherein X, Y and M are each hydrogen.

6. The partial anhydride as set forth in claim 1 wherein X and Y are each hydrogen and M is a combination of hydrogen and sodium ions, at least two of said sodium ions being present in said combination.

7. The partial anhydride as set forth in claim 1 wherein X and Y are each hydrogen and M is a combination of sodium and potassium ions.

8. A partial anhydride of an alkylidene phosphonyl phosphine oxide having the formula:

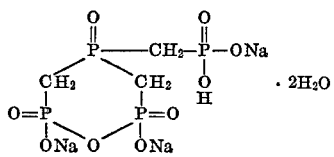 · 2H$_2$O

9. A patrial anhydride of an alkylidene phosphonyl phosphine oxide having the formula:

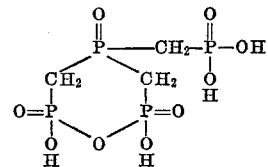

References Cited

UNITED STATES PATENTS 2,717,906  9/1955  Lechen et al. _____ 260—500

OTHER REFERENCES

Medved et al., Izvest Akad Navk SSSR 1968, 2062.

LORRAINE A. WEINBERGER, Primary Examiner

R. GERSTL, Assistant Examiner

U.S. Cl. X.R.

8—116; 252—8 T; 260—280 R, 429 R, 429.9, 439 R, 501.15, 501.21, 927